US011054628B2

(12) United States Patent
Soto et al.

(10) Patent No.: US 11,054,628 B2
(45) Date of Patent: Jul. 6, 2021

(54) ADJUSTABLE NIGHT VISION GOGGLE ADAPTER

(71) Applicant: NOROTOS, INC., Santa Ana, CA (US)

(72) Inventors: Ronald R. Soto, Santa Ana, CA (US); Jonathon R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 0 days.

(21) Appl. No.: 16/683,182

(22) Filed: Nov. 13, 2019

(65) Prior Publication Data

US 2021/0141207 A1 May 13, 2021

(51) Int. Cl.
*G02B 23/12* (2006.01)
*F16M 11/12* (2006.01)
*A42B 3/04* (2006.01)

(52) U.S. Cl.
CPC ......... *G02B 23/125* (2013.01); *F16M 11/121* (2013.01); *A42B 3/042* (2013.01)

(58) Field of Classification Search
CPC .............. G02B 23/125; G02B 27/0176; F16M 11/121; F16D 7/08; A42B 3/042; A42B 3/04; Y10T 403/592
See application file for complete search history.

(56) References Cited

U.S. PATENT DOCUMENTS

| 3,252,303 | A | * | 5/1966 | Weasler | F16D 7/08 464/36 |
| 4,088,418 | A | * | 5/1978 | Dann | B23B 31/1071 408/139 |
| 5,506,730 | A | * | 4/1996 | Morley | A42B 3/04 359/815 |
| 6,249,386 | B1 | * | 6/2001 | Yona | A42B 3/042 2/414 |
| 6,472,776 | B1 | * | 10/2002 | Soto | A42B 3/04 307/400 |
| 7,735,159 | B2 | * | 6/2010 | Prendergast | F16M 13/00 2/422 |
| 8,127,374 | B2 | * | 3/2012 | Willey | A42B 3/042 2/422 |
| 8,830,575 | B2 | * | 9/2014 | Rivkin | G02B 23/18 359/409 |
| 8,867,128 | B2 | * | 10/2014 | Rivkin | G02B 27/0176 359/409 |
| 8,870,149 | B2 | * | 10/2014 | Rodig | H05K 7/1412 248/503 |
| 9,622,530 | B2 | * | 4/2017 | DiCarlo | A42B 3/04 |

(Continued)

*Primary Examiner* — Matthew R McMahon
(74) *Attorney, Agent, or Firm* — Lewis Roca Rothgerber Christie, LLP

(57) ABSTRACT

An adjustable night vision goggle adapter device includes: a mounting point configured to attach to a helmet; a body affixed to the mounting point and including a surface having a first half of a bearing/detent interface and a central axis; and an arm rotatable about the central axis, having: a first end including a second half of the bearing/detent interface and being configured to rotate about the central axis; and a second end configured to form a joint with a night vision goggle interface, wherein the joint is configured to be rotatable about a shaft and is further configured to be lockable into a fixed position holding the night vision goggle interface at a fixed angle relative to the rotatable arm.

20 Claims, 14 Drawing Sheets

(56) References Cited

U.S. PATENT DOCUMENTS

| | | | | |
|---|---|---|---|---|
| 9,781,963 | B1* | 10/2017 | Celona | A42B 3/04 |
| 9,958,667 | B2* | 5/2018 | DiCarlo | F16M 11/041 |
| 10,288,864 | B2* | 5/2019 | Prendergast | A42B 3/042 |
| 2011/0239354 | A1* | 10/2011 | Celona | A42B 3/04 2/422 |
| 2019/0174041 | A1* | 6/2019 | Wang | G02B 27/0176 |

* cited by examiner

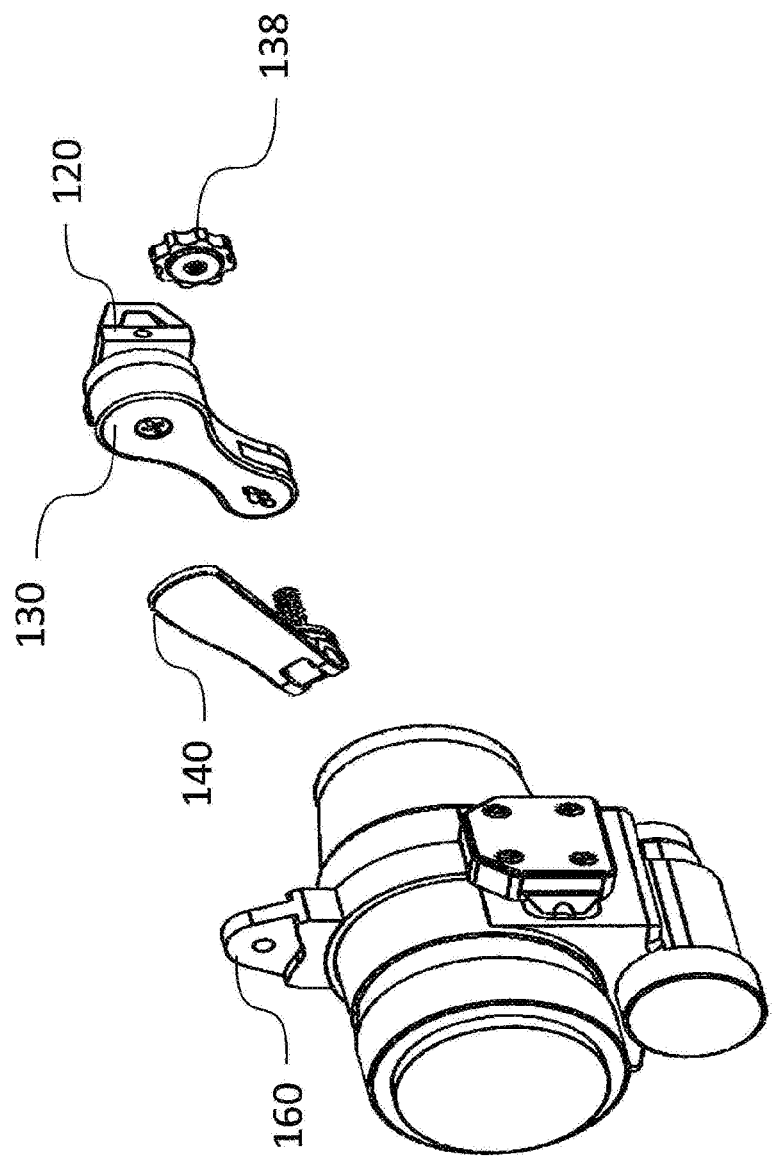

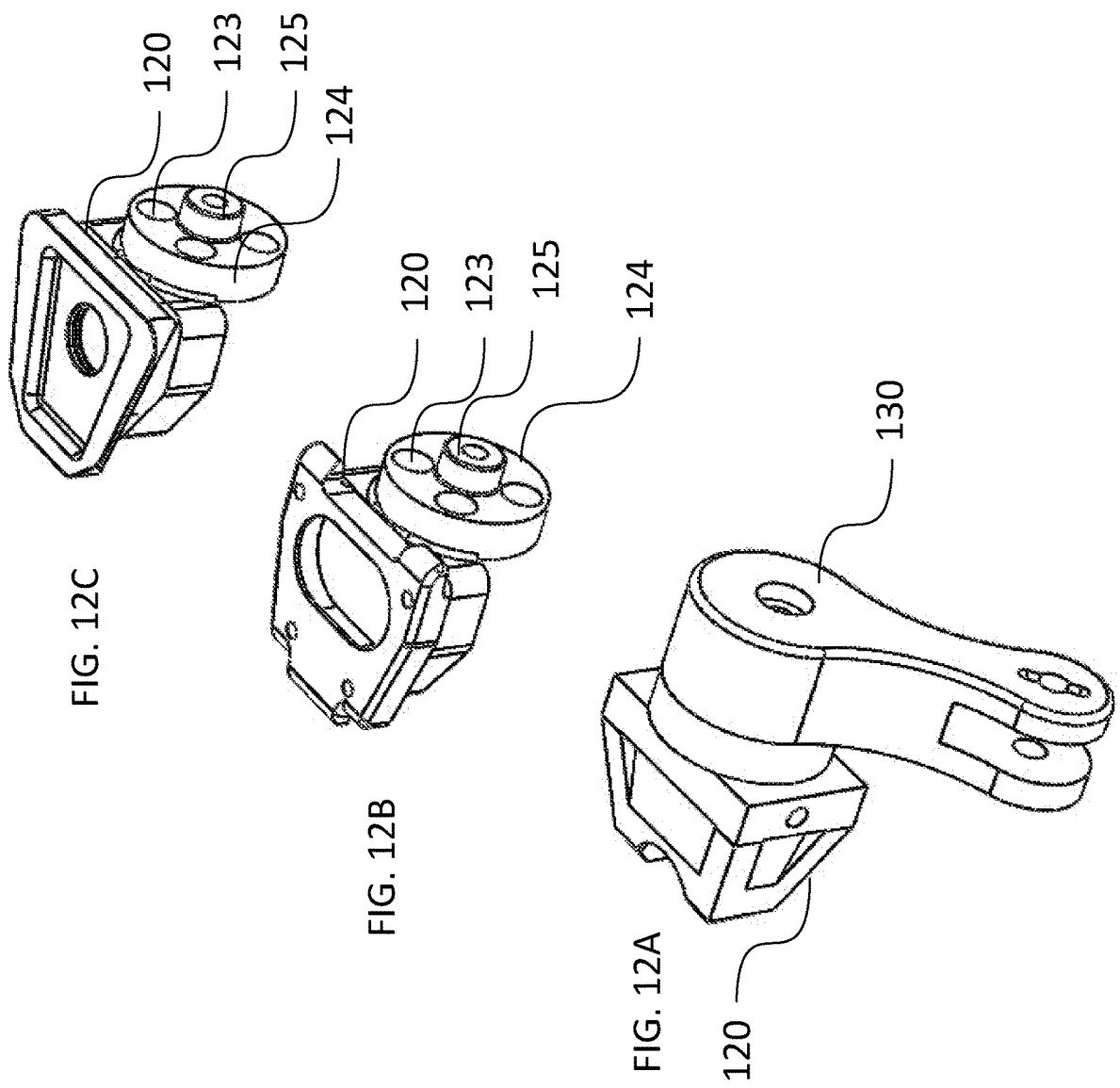

ADJUSTABLE NIGHT VISION GOGGLE ADAPTER

TECHNICAL FIELD

The present invention relates generally to night vision goggle adapter devices. More specifically, the present disclosure describes embodiments of an adjustable night vision goggle adapter.

BACKGROUND

While wearing a helmet, it may be beneficial to attach night vision goggles to the helmet. This attachment, however, often results in an inexact fit of the night vision goggles due to factors such as variations in the helmet mounts, variations in the dimensions of the night vision goggles, and variations in the facial features of a user. This may result in frustration in trying to use the night vision goggles, and also lead to errors or imprecise use of the night vision goggles. Moreover, if an adapter is used to allow use of a particular helmet mount with a particular night vision goggle, the adapter may make adjustment of the position of the night vision goggles during use more difficult. Additionally, the adapter may add to the height profile when a night vision goggle is placed in the stowed position back over the helmet. This additional height may make it difficult to wear the night vision goggles in the stowed position while in tight confines such as within a vehicle.

To overcome the shortcomings with existing night vision goggle adapters, the present disclosure describes, in one or more embodiments, an adjustable night vision goggle adapter to mitigate or obviate one or more of the aforementioned problems. For example, in one or more embodiments, the adjustable adapter may provide coarse position adjustment of the night vision goggles allowing the night vision goggles to be quickly moved into various, pre-set positions. The adjustable adapter may also provide fine position adjustment, in one or more embodiments, to allow for a user to quickly make small adjustments to the positioning of night vision goggles while the night vision goggles are more coarsely positioned in one of the pre-set positions. The adjustable night vision goggle adapter of the present disclosure may thus overcome the problems mentioned above by providing multiple, independent levels of position adjustability for the night vision goggles while used with a helmet.

SUMMARY

The present disclosure describes embodiments of an adjustable night vision goggle adapter configured to allow for both coarse and fine adjustment of the positioning of night vision goggles when used in conjunction with the adjustable night vision goggle adapter device. Various embodiments of the adjustable night vision goggle adapter device are described herein which may include one or more of the following features.

An adjustable night vision goggle adapter device includes: a mounting point configured to attach to a helmet; a body affixed to the mounting point and including a surface having a first half of a bearing/detent interface and a central axis; and an arm rotatable about the central axis, having: a first end including a second half of the bearing/detent interface and being configured to rotate about the central axis; and a second end configured to form a joint with a night vision goggle interface, wherein the joint is configured to be rotatable about a shaft and is further configured to be lockable into a fixed position holding the night vision goggle interface at a fixed angle relative to the rotatable arm.

The adjustable night vision goggle adapter device may be embodied wherein the mounting point includes a goggle horn.

The adjustable night vision goggle adapter device may be embodied wherein the first half of the bearing/detent interface includes a plurality of detents.

The adjustable night vision goggle adapter device may be embodied wherein there are four detents equally spaced about the central axis of the surface of the body.

The adjustable night vision goggle adapter device may be embodied wherein the joint includes a rotatable cam having a lever arm configured to rotate the cam between a locked and a released position, the rotatable cam in the locked position being configured to apply a force upon the joint such that the night vision goggle interface is held in the fixed position relative to the rotatable arm.

The adjustable night vision goggle adapter device may be embodied wherein the rotatable cam further includes a knurled nut configured to be coupled to the joint and rotated about the shaft in a position opposite that of the rotatable cam allowing for an adjustable amount of force to be applied by the rotatable cam on the joint when rotated into the locked position.

The adjustable night vision goggle adapter device may be embodied wherein the joint includes a setting pin configured to traverse through a longitudinal hole of the shaft and to seat within an ear formed within the second end of the rotatable arm thereby fixing the rotatable cam into an orientation relative to the rotatable arm.

The adjustable night vision goggle adapter device may be embodied wherein the second half of the bearing/detent interface includes one or more blind wells that contain a spring and a ball such that the spring is compressed and exerts a pressure on the ball.

The adjustable night vision goggle adapter device may be embodied wherein the second half of the bearing/detent interface includes an equal number of the blind wells, springs, and balls as the first half of the bearing/detent interface has detents.

The adjustable night vision goggle adapter device may be embodied wherein the mounting point is a hotshoe mount.

The adjustable night vision goggle adapter device may be embodied wherein the mounting point is a dovetail plate.

The adjustable night vision goggle adapter device may be embodied wherein the shaft has an exterior surface that includes threads.

The adjustable night vision goggle adapter device may be embodied wherein the central axis further includes a low-friction bearing.

The adjustable night vision goggle adapter device may be embodied wherein the low-friction bearing is a roller bearing.

The adjustable night vision goggle adapter device may be embodied wherein the adjustable night vision goggle adapter further includes a U-shaped arm having a goggle retainer at each end.

The adjustable night vision goggle adapter device may be embodied wherein the U-shaped arm has two retainers located at each end configured to secure a night vision goggle at two points on opposing sides of the night vision goggle.

The adjustable night vision goggle adapter device may be embodied wherein the goggle retainers include a spring-loaded retention mechanism.

This summary is provided to introduce a selection of concepts that are described below in the detailed description. This summary is neither intended to identify key or essential features of the claimed subject matter, nor is it intended to be used in limiting the scope of the claimed subject matter.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 11A is a depiction of a night vision goggle design that can be used in conjunction with night vision goggle interface of the adjustable night vision goggle adapter.

FIG. 12A is a depiction of a helmet mount design that can be used in conjunction with the adjustable night vision goggle adapter.

FIG. 12B is a depiction of an alternative helmet mount design that can be used in conjunction with the adjustable night vision goggle adapter.

FIG. 12C is a depiction of another alternative helmet mount design that can be used in conjunction with the adjustable night vision goggle adapter.

DETAILED DESCRIPTION

Figure 1:
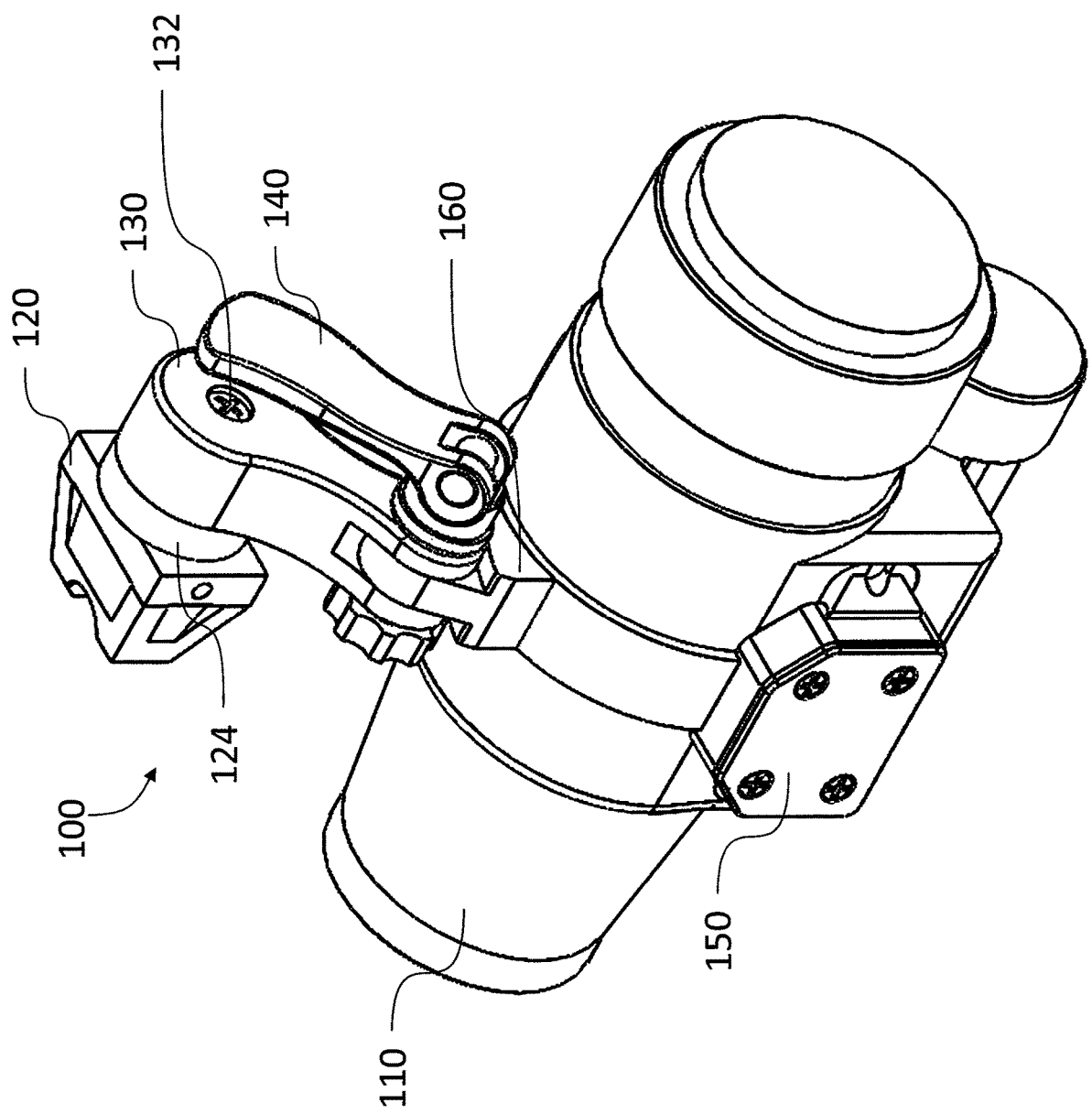
FIG. 1 is a perspective view of an embodiment of the assembled adjustable night vision goggle adapter interfaced with a night vision goggle.

Features of the inventive concept and methods of accomplishing the same may be understood more readily by reference to the following detailed description of embodiments and the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

FIG. 1 is an illustration of the adjustable night vision google adapter 100 interfaced to a night vision goggle 110. The adjustable night vision goggle adapter 100 includes a mounting point 120, depicted here as a goggle horn, that has a body 124 affixed to the mounting point 120. The body is depicted here as being cylindrical in shape, however, any suitable geometry for the body may be used within the scope of the present disclosure. As will be understood by those skilled in the art, and discussed further below in reference to FIG. 12, any suitable mounting structure for attaching the adjustable night vision goggle adapter 100 to a helmet or other apparatus may be used within the scope of the present disclosure.

Figure 6:
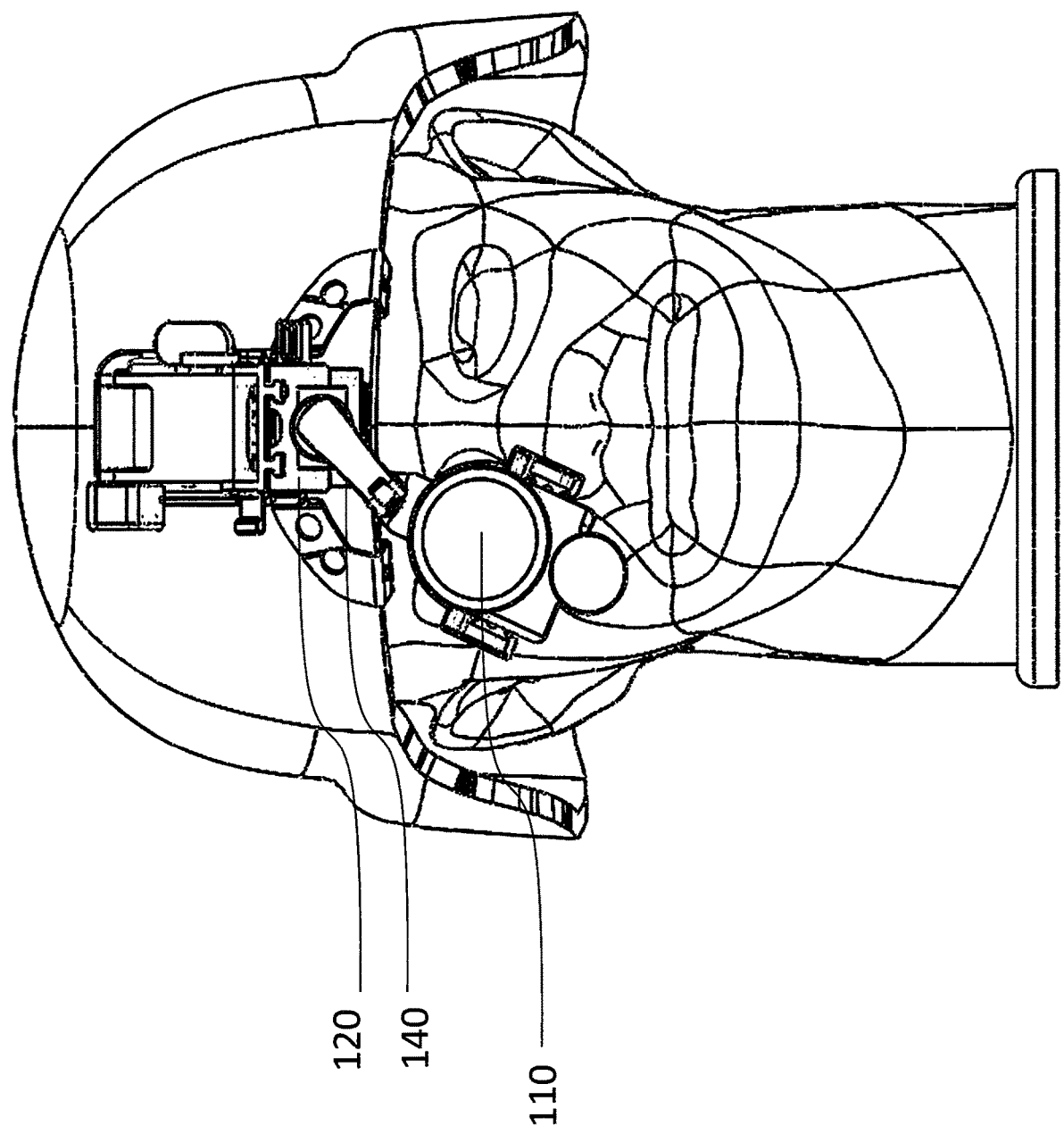
FIG. 6 is a depiction of an embodiment of the adjustable night vision goggle adapter being worn by a user over the right eye in conjunction with a helmet.

The body 124 is coupled to one end of a rotating arm 130 about a central axis having a locking point and using a locking member 132. The locking member 132 forms an axis of rotation for the rotating arm 130. As will be discussed in greater detail below, the rotating arm 130 can be set to rotate about the central axis into a plurality of predefined positions. For example, there may be positions that correspond to placing a night vision goggle 110 in front of the right eye of a user while the device is in use (FIG. 6). There may also be other predefined positions about the central axis at which the rotating arm can be positioned. The use of these predefined positions allows for coarse adjustment over the positioning of the night vision goggles.

The rotating arm 130 is also depicted as being coupled at its other end to a night vision goggle interface 160 in a rotatable configuration utilizing a locking, rotatable cam 140 assembly. As will be discussed below in greater detail, the rotatable cam 140 allows for the night vision goggle interface 160 to be rotated relative to the rotating arm 130 and thereby provide more fine adjustment over the positioning of the night vision goggle 110. The night vision goggle 110 is depicted as being held in a fixed position relative to the night vision goggle interface 160 by a night vision goggle retainer 150.

Figure 2:
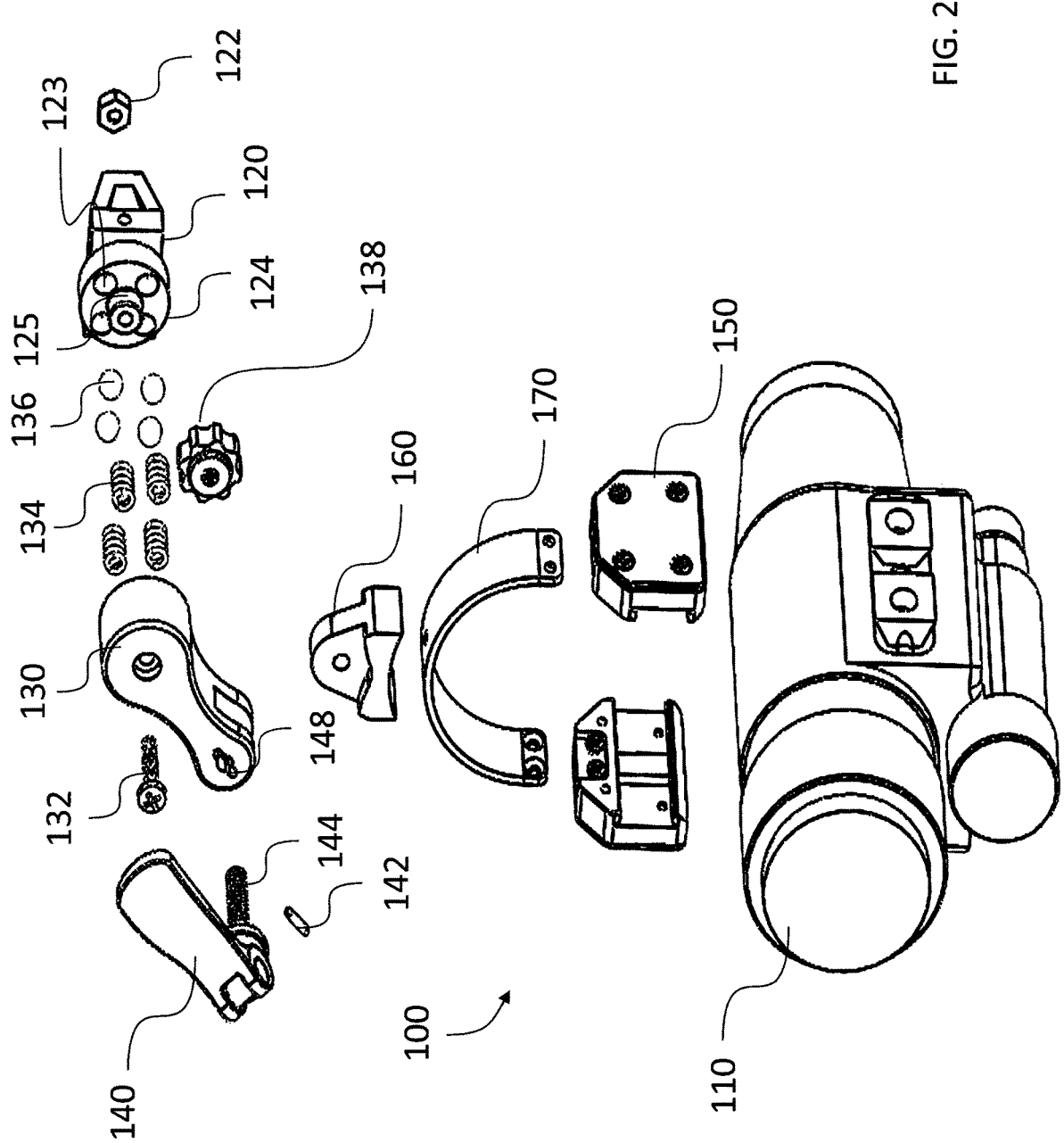
FIG. 2 is an exploded view of an embodiment of the adjustable night vision goggle adapter depicted alongside a night vision goggle.

FIG. 2 is an illustration of an exploded view of an embodiment of the adjustable night vision goggle adapter 100. According to some embodiments, the mounting point 120 may be affixed to the body 124. The body 124 may have a front surface including one or more detents 123. Also, the body may be configured to include a low-friction cylindrical surface or bearing 125 affixed and projecting from its front surface. Any suitable type of bearing may be used, such as a ball bearing, to increase the ease by which the rotating arm 130 can freely rotate about the central axis of the body 124. As depicted, the rotating arm 130 may be configured to house one or more springs 134 and one or more balls 136 within one or more blind wells (131 of FIG. 4) at one end of the rotating arm 130. The one or more balls 136 may be sized such that they are configured to rest partially within a detent 123 of the body 124 when the rotating arm 130 is coupled to the body 124. There are thus two bearing surfaces at the bearing/detent interface. The first being the surface surrounding the central axis of the body 124 and which may include either a smooth surface for reduced friction or the inclusion of a low-friction bearing 125. The second bearing surface is thus the surface upon which the balls 136 of the bearing/detent interface move along. It will be understood by one skilled in the art that the first bearing surface is intended to assist the rotating arm 130 in freely rotating about the central axis of the body 124, while the second bearing surface includes detents intended to prevent the free rotation of the rotating arm 130 by retaining the rotating arm 130 in positions defined by the locations of the detents 123 along the second bearing surface.

When coupled to the body 124, the rotating arm 130 may rotate about the central axis including a locking member 132. The locking member may, in some embodiments, be a threaded member that interfaces with a suitably sized nut 122 that can be used in conjunction with the mounting point 120. The locking member may also interface with the low-friction bearing 125 such that the rotating arm 130 can more easily rotate about the central axis of the body 124.

As is further depicted in FIG. 2, a plurality of springs 134 and a plurality of balls 136 may be used in conjunction with the one or more detents 123. For example, there may be four springs 134 used to provide pressure upon four balls 136 that are configured to rest partially within one or more of the detents 123 of the body 124. This may create a bearing/detent interface where the balls 136 are pressed into the detents 123 by a pressure exerted by the one or more springs 134. This configuration may allow for the rotating arm 130 to rotate about the central axis of the body 124 until one or more balls 136 are pressed into one or more detents 123, at which point the rotating arm 130 will be held in a fixed orientation relative to the body 124 until a sufficient amount of rotational force is applied to the rotating arm 130 such that the force exerted on the balls 136 by the springs 134 is overcome. As a non-limiting example, FIG. 2 depicts there being four springs 134 being used in conjunction with four balls 136 that correspond to four detents 123 located on the surface of the body 124. This provides four positions at which the rotating arm can be fixed. In some embodiments, these positions may correspond to positions wherein the night vision goggles are placed in front of the right eye (FIG. 6), in front of the left eye (FIG. 7), or in a stowed position above the eyes (not depicted).

The placement and number of the detents 123 and the number of balls 136 and springs 134 used within the adjustable night vision goggle adapter 100 may be varied to provide for different numbers of fixed positions into which the rotating arm 130 can be placed and for altering the amount of rotational force that must be applied to rotate the rotating arm 130 between fixed positions. The amount of rotational force that must be applied to overcome the detents is proportional to the number of balls 136 located within the detents 123 and the force being exerted on the balls 136 by the springs 134. As such, it is possible to configure the adjustable night vision goggle adapter 100 with differing numbers and types of springs 134 and balls 136 such that different amounts of force are required to rotate the rotating arm 130.

As will be appreciated by those skilled in the art, the configuration of the bearing/detent interface may be reversed from that depicted in FIG. 2. In such a configuration, the blind wells (131 of FIG. 4), springs 134, and balls 136 may be located within the body 124 while the detents are located upon the rotating arm 130. The mechanics of operation for such a configuration are the same as described above, with the amount of rotational force required to rotate the rotating arm 130 being proportional to the number of balls 136 interfaced with detents 123 and the pressure exerted upon the balls by the springs 134.

Figure 3:
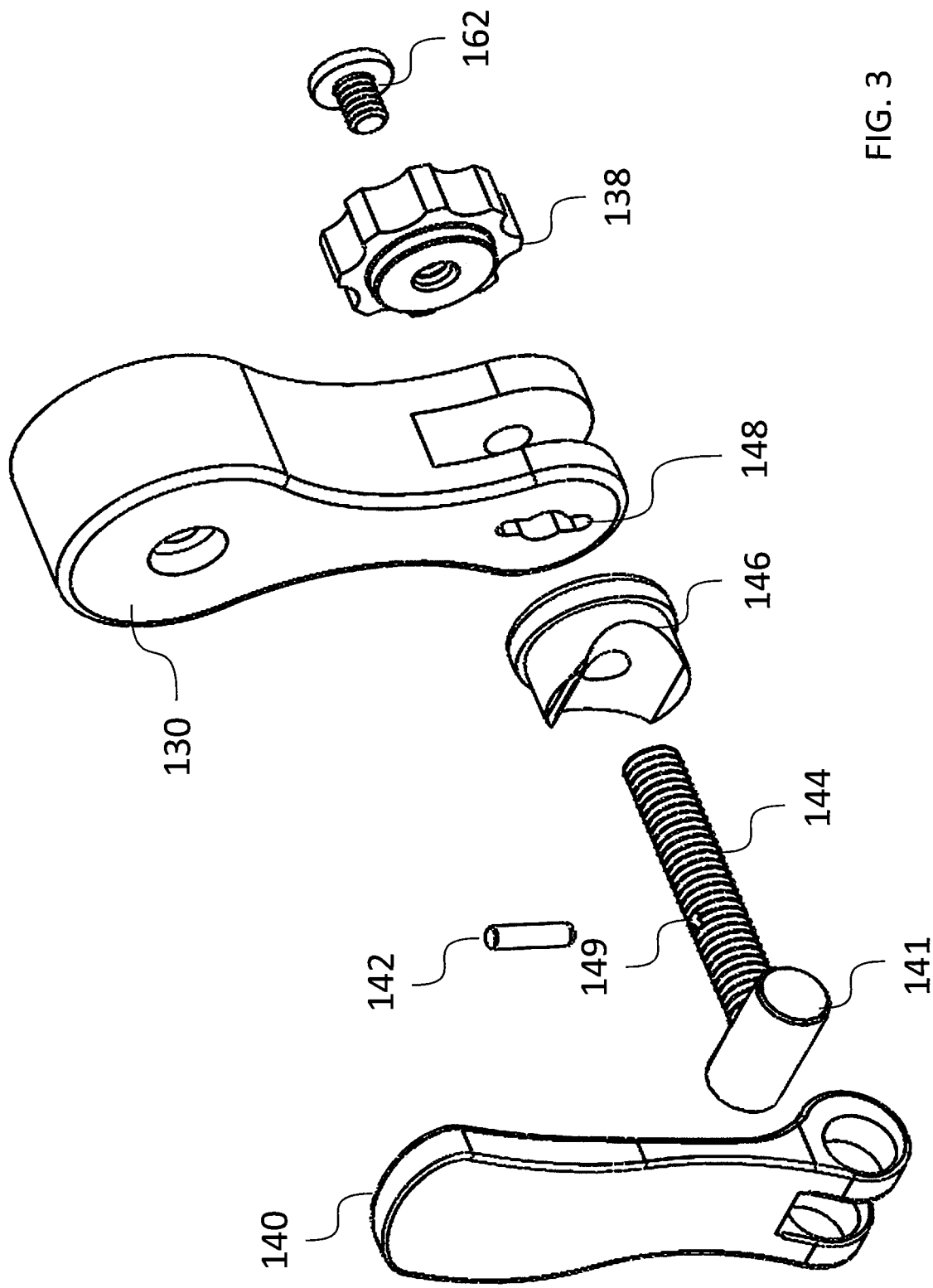
FIG. 3 is an exploded view of an embodiment of the adjustable cam assembly.

The rotating arm 130 has a first end that forms a portion of the bearing/detent interface, and a second end configured to form a joint for use with the night vision goggle interface 160. The joint is formed around a shaft 144 that has a first end and a second end. The first end of the shaft 144 includes a rotatable cam 140 and a longitudinal hole (as shown in FIG. 3) through which a setting pin 142 can placed. The setting pin 142 engages a pair of ears 148 formed within the second end of the rotating arm 130. While engaged with the ears 148, the setting pin keeps the shaft from rotating and holds the rotatable cam 140 in a fixed orientation relative to the rotating arm 130. The second end of the shaft 144 may be configured to interface with a nut 138. The nut 138 may have a knurled surface, as is depicted in FIG. 2. The shaft 144 may be threaded and the nut 138 may be screwed down along the length of the shaft 144 to adjust the pressure exerted by the rotatable cam 140 when it is in a closed position. The rotatable cam 140 and shaft 144 will be further described in regards to FIGS. 3 and 4.

The night vision goggle interface 160 forms a portion of the joint. The night vision goggle interface 160 is rotatable about the shaft 144 while assembled, and has a range of motion about the shaft 144 defined by the proportions of the joint. The night vision goggle interface 160 may be configured either to attach directly to a night vision goggle or, as depicted in FIG. 2, be configured to mount to a retaining assembly having an arm 170 and one or more retainers 150. Depicted in FIG. 2 is a U-shaped arm 170 configured for use with a pair of retainers 150 that can be affixed to the U-shaped arm 170 to hold a night vision goggle 110 in place. The design of the retainer assembly including the arm 170 and the retainer 150 will be described in more detail in regards to FIG. 5.

Turning now to FIG. 3, an exploded view of the rotatable cam 140 assembly is depicted. The rotatable cam 140 is configured to be rotatable about an axis 141 having a cylindrical shape and located at the first end of the shaft 144. The rotatable cam 140 is configured to couple to a washer 146 that has a surface configured to have a force exerted on it by the rotatable cam 140 as it is rotated into a closed position. This allows for the rotatable cam 140 to move between an open and a closed position. The second end of the shaft 144 is configured to have the nut 138 threaded onto the shaft 144 such that it can be screwed down the length of the shaft 144 towards its first end. As depicted in FIG. 3, the nut 138 may have a knurled surface to facilitate ease of use and a solid grip for the user. The second end of the shaft may also be configured to have a stopper 162 affixed to it such that the stopper 162 holds the nut 138 captive on the shaft 144 and prevents it from leaving the threads. The stopper 162 may be any suitable structure for preventing the nut 138 from leaving the threads. For example, as is shown in FIG. 3, the stopper 162 may be a screw having a flanged top wherein the stopper 162 may be threaded into an opening of the second end of the shaft 144 such that the flanged top is larger in size than the diameter of the shaft 144 and thus prevents the nut 138 from passing over the second end of the shaft 144.

The setting pin 142 is configured to fit within a longitudinal hole 149 within the shaft 144 and is further configured to engage with the ears 148 of the second end of the rotating arm 130. This holds the rotatable cam 140 in a fixed orientation relative to the rotating arm 130. The amount of pressure exerted by the rotatable cam 140 upon the joint can be adjusted by loosening or tightening the nut 138 opposite the rotatable cam 140 along the shaft 144. When assembled, the night vision goggle interface 160 is located about the shaft 144 and is within the joint such that it can be held in a fixed position by the pressure exerted on the joint when the rotatable cam 140 is in the closed position. When the rotatable cam 140 is open, the night vision goggle interface 160 can be infinitely adjusted within the range of motion of the joint, which is defined by the proportions of the joint. This allows for fine adjustment to be made to the positioning of the night vision goggles 110 thus enabling a better fit to an individual user. After the night vision goggles 110 have been rotated into a preferred position by a user, the user can close the rotatable cam 140 to lock the orientation of the night vision goggle interface 160 within the joint and thus retain the night vision goggles 110 in place during use.

Figure 4:
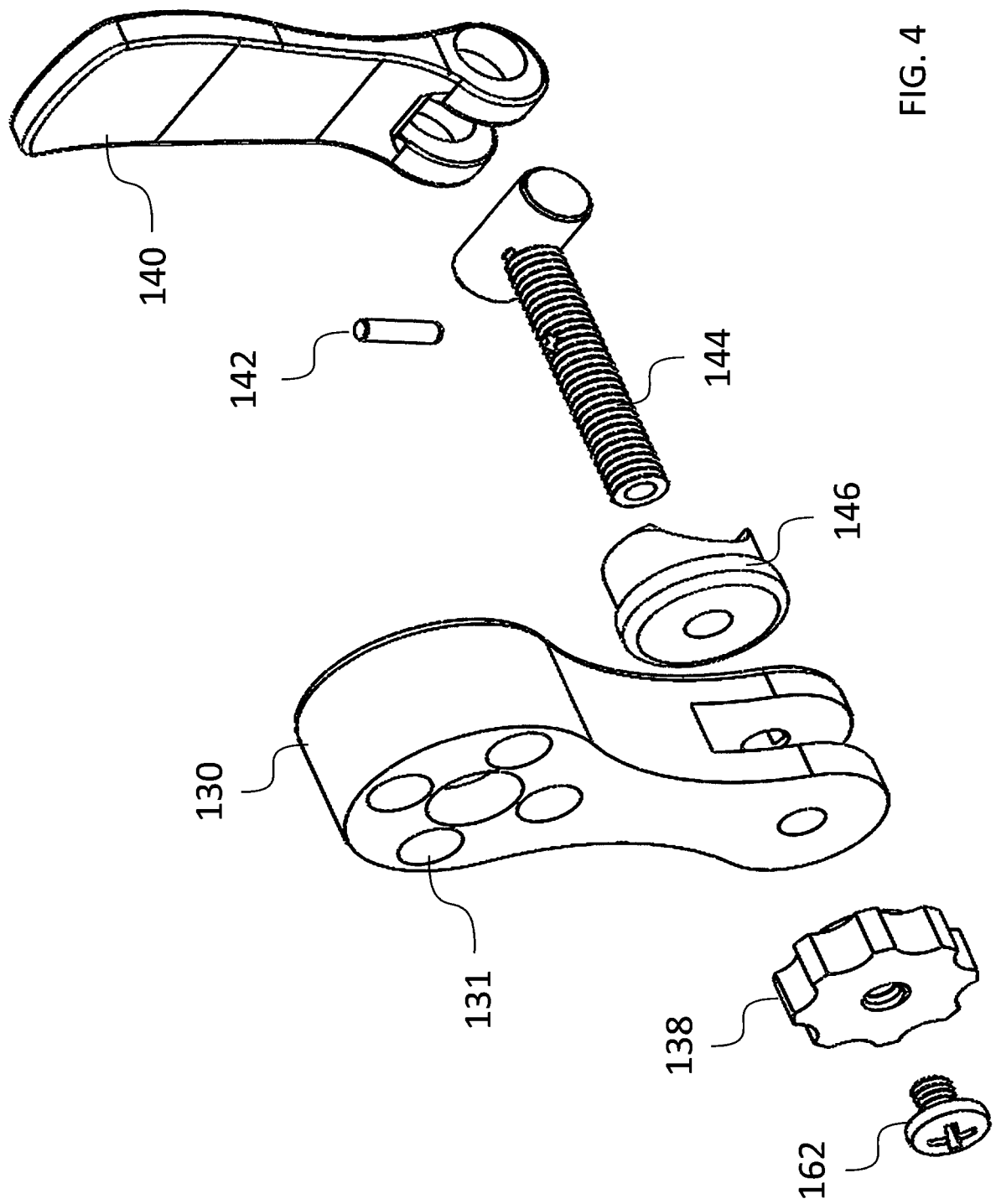
FIG. 4 is an alternative, exploded view of an embodiment of the adjustable cam assembly.

FIG. 4 depicts a different perspective on the exploded rotatable cam 140 assembly of FIG. 3. As can be seen in FIG. 4, the blind wells 131 of the rotating arm 130 are located, in some embodiments, on the end of the rotating arm 130 opposite the joint. In some alternative embodiments (not depicted) the rotating arm 130 may include the detents 123 of the bearing/detent interface.

Figure 5:
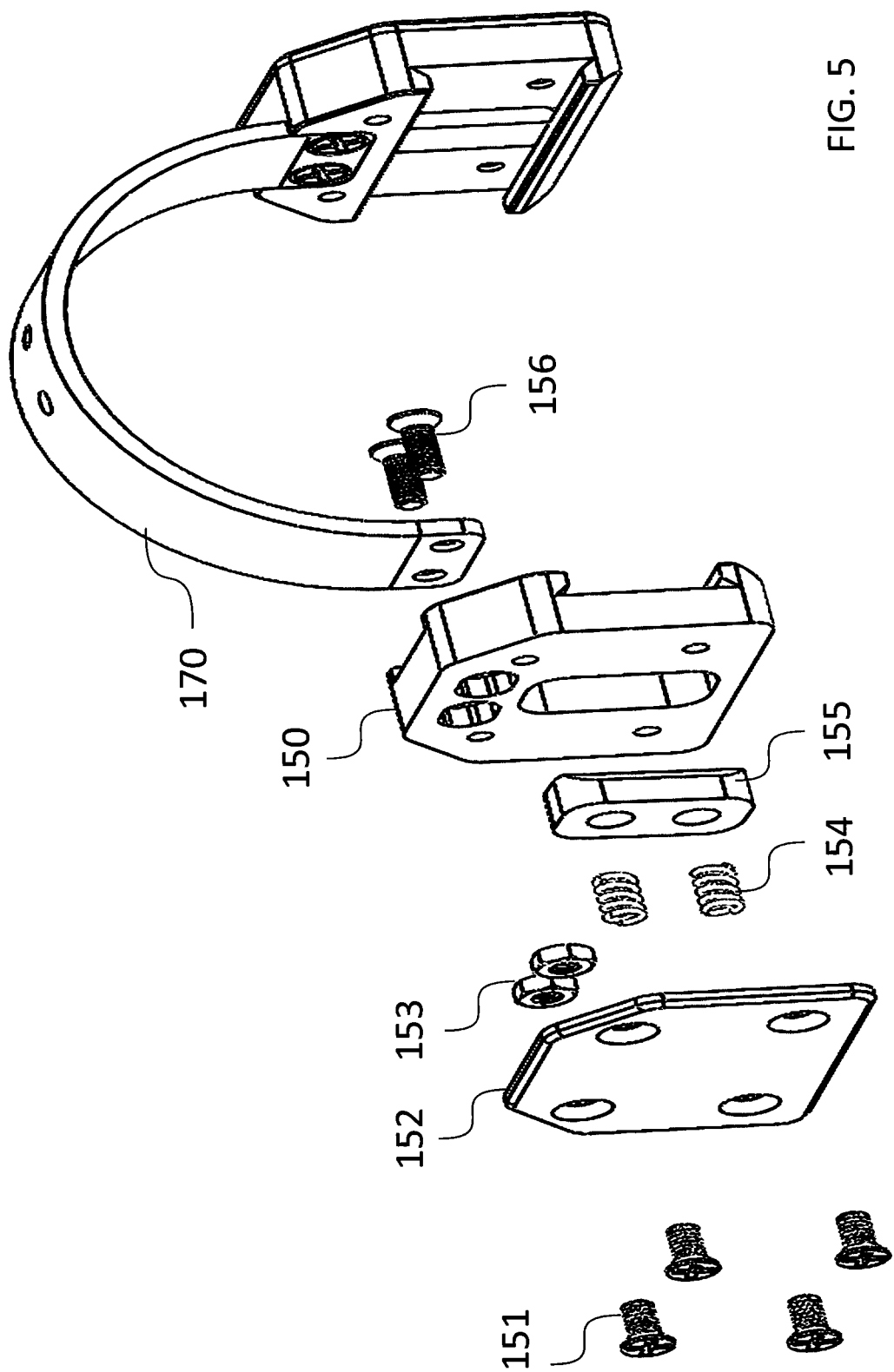
FIG. 5 is a partially exploded view of an embodiment of a night vision goggle interface of the adjustable night vision goggle adapter.

FIG. 5 presents an exploded view of the night vision goggle retainer 150 and the arm 170. The arm 170 is shown as U-shaped and is configured with a night vision goggle retainer 150 at each end. However, one skilled in the art will appreciate that the arm may take any shape as is appropriate for fitting over a night vision goggle 110 (FIG. 1). Furthermore, the arm 170 may be omitted where the night vision goggles 110 (not shown) will permit the night vision goggle interface 160 to be mounted to the night vision goggles 110 (not shown) directly. As will be appreciated by one skilled in the art, many different geometries for the arm may be used. However, it may be advantageous to use the U-shaped arm 170 as depicted in FIG. 5 because it may provide two connection points on opposing sides of the night vision goggle 110 (FIG. 1) and such a structure may be less prone to wobble than when using only a single connection point.

The night vision goggle retainer 150 may include any structure suitable for retaining a night vision goggle to a structure. This may include, as is depicted in FIG. 5, screws 151 and nuts 153. As is further depicted in FIG. 5, the retainer may also use spring-loaded components configured to interface with grooves or channels on a night vision goggle 110 (FIG. 2) that allows for rapidly connecting and securing a night vision goggle 110 (FIG. 1) to the retainer 150. For example, as depicted in FIG. 5, the night vision goggle retainer 150 may be configured to slide over a connection point on a night vision goggle 110 (FIG. 1) and "snap" into place when the spring-loaded locking element 155 is correctly aligned with a groove or channel on the night vision goggle 110 (FIG. 1).

As will be appreciated by one skilled in the art, any suitable structure for retaining the night vision goggles 110 may alternatively be used. A backing plate 152 may be used to allow for one or more springs 154 to exert a force upon a locking element 155 that may interface directly with the night vision goggles. Thus, when assembled, the night vision goggle retainer 150 of FIG. 5 may be held together by screws 151 and may be affixed by an additional set of screws 156 to the arm 170.

FIG. 6 depicts a night vision goggle adapter 100 in use with a helmet as being worn by a user. The night vision goggles 110 are depicted as being held over a right eye of the user. The rotatable cam 140 can be seen in the closed position, and the mounting point 120 can be seen as connected to the mount of the helmet. FIG. 6 thus provides a head-on depiction of how the night vision goggles 110 may be positioned during use as facilitated by the adjustable night vision goggle adapter 100.

Figure 7:
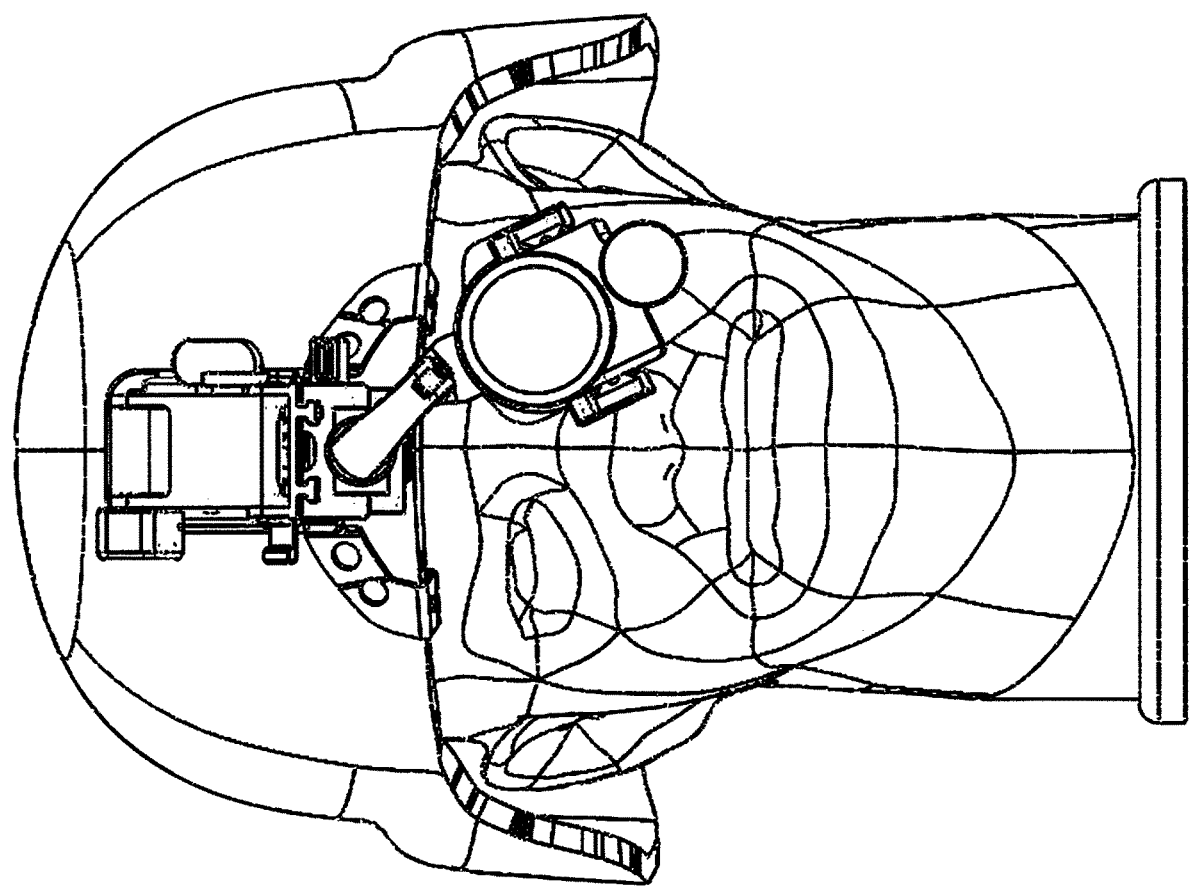
FIG. 7 is a depiction of an embodiment of the adjustable night vision goggle adapter being worn by a user over the left eye in conjunction with a helmet.

FIG. 7 depicts a night vision goggle adapter 100 in use with a helmet as being worn by a user. The night vision goggles 110 are depicted as being held over a left eye of the user. FIG. 7 thus provides a head-on depiction of how the night vision goggles 110 may be positioned during use, over a left eye of a user, as facilitated by the adjustable night vision goggle adapter 100.

The movement of the rotating arm 130 from the position of FIG. 6 to that of FIG. 7 is accomplished by exerting a sufficient rotational force to the rotating arm 130 such that the force exerted by the detents 123 on the balls 136 at the bearing/detent interface is overcome and the balls 136 are released from the detents 123. This allows for the rotating arm 130 to freely rotate into the next position defined by the detents 123 of the bearing/detent interface. As shown in FIGS. 6 and 7, the user may quickly select which eye he or she views the night vision goggle 110 through by rotating the rotating arm 130 into a preferred position. The use of four detents 123, as previously depicted in FIG. 2, allows for the use of positions corresponding to the right eye of the user (FIG. 6), the left eye of the user (FIG. 7), a position above the right eye of the user (not depicted), and a position above the left eye of the user (not depicted).

Figure 8:
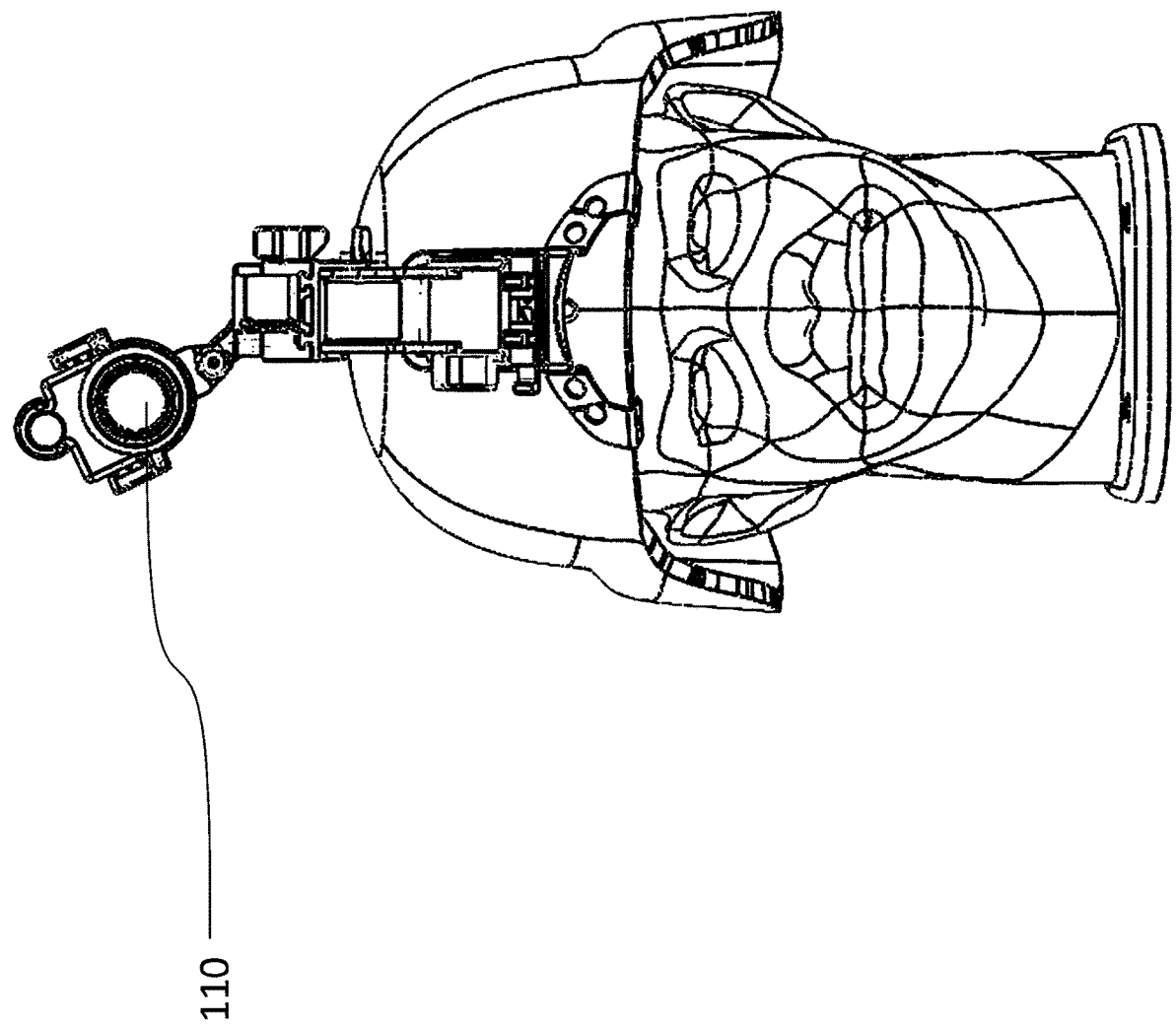
FIG. 8 is a depiction of an embodiment of the adjustable night vision goggle adapter being worn by a user in a stowed position.

FIG. 8 presents the same view of the adjustable night vision goggle adapter 100 as was shown in FIG. 6, but with the night vision goggle adapter 100 being placed into a "stowed" position wherein the helmet mount is flipped upwards rotating the night vision goggles 110 away from the face of the user. The helmet mount may be rotated away from the user's eyes thus lifting the night vision goggles 110 into a position above the eyes until the night vision goggles 110 reach a point where they can be securely retained. The "stowed" position allows for a user to quickly move the night vision goggles 110 away from the eyes without having to manipulate the rotating arm 130 or the rotatable cam 140.

Figure 9:
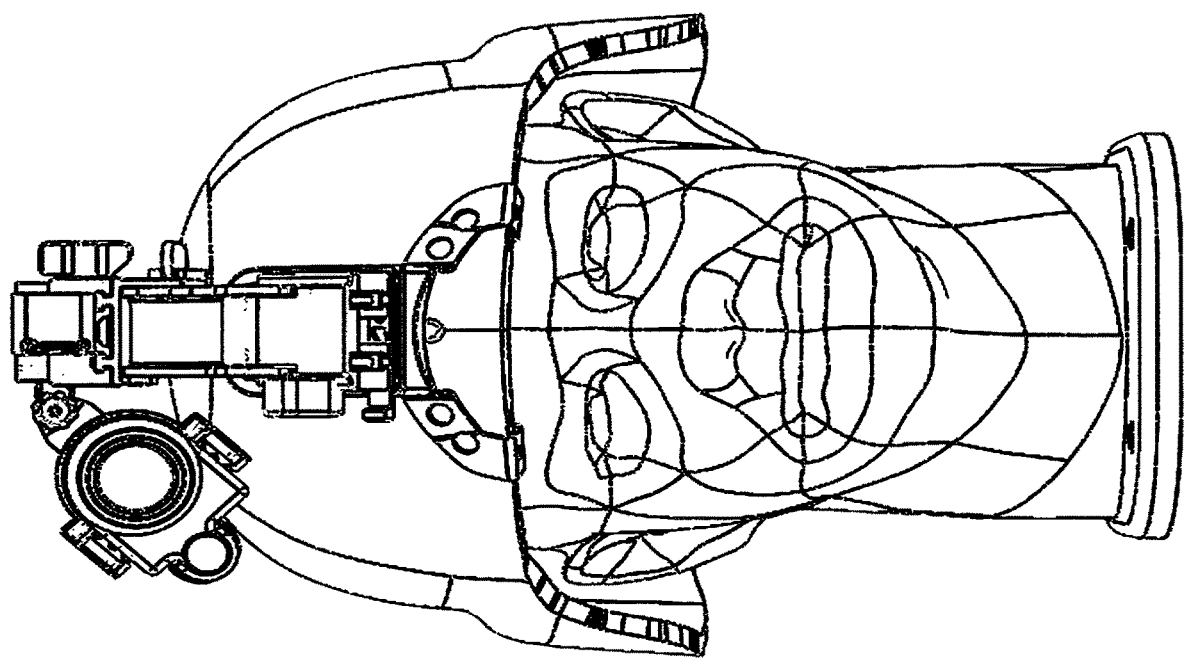
FIG. 9 is a depiction of an embodiment of the adjustable night vision goggle adapter being worn by a user in a stowed and folded position.

FIG. 9 present the same view as FIG. 8, but with the night vision goggles 110 in a "stowed and folded" position. In such a position, the night vision goggles 110 may be rotated away from the face, and the rotatable cam 140 can be release to allow for the night vision goggles 110 to rotate to a lower position relative to the user. This may help to reduce the height of the night vision goggles 110 while stowed. This may be advantageous when working in small confines, such as within a vehicle, where the reduction in height may help to prevent the night vision goggles 110 from bumping into low-hanging objects or doorways.

Figure 10:
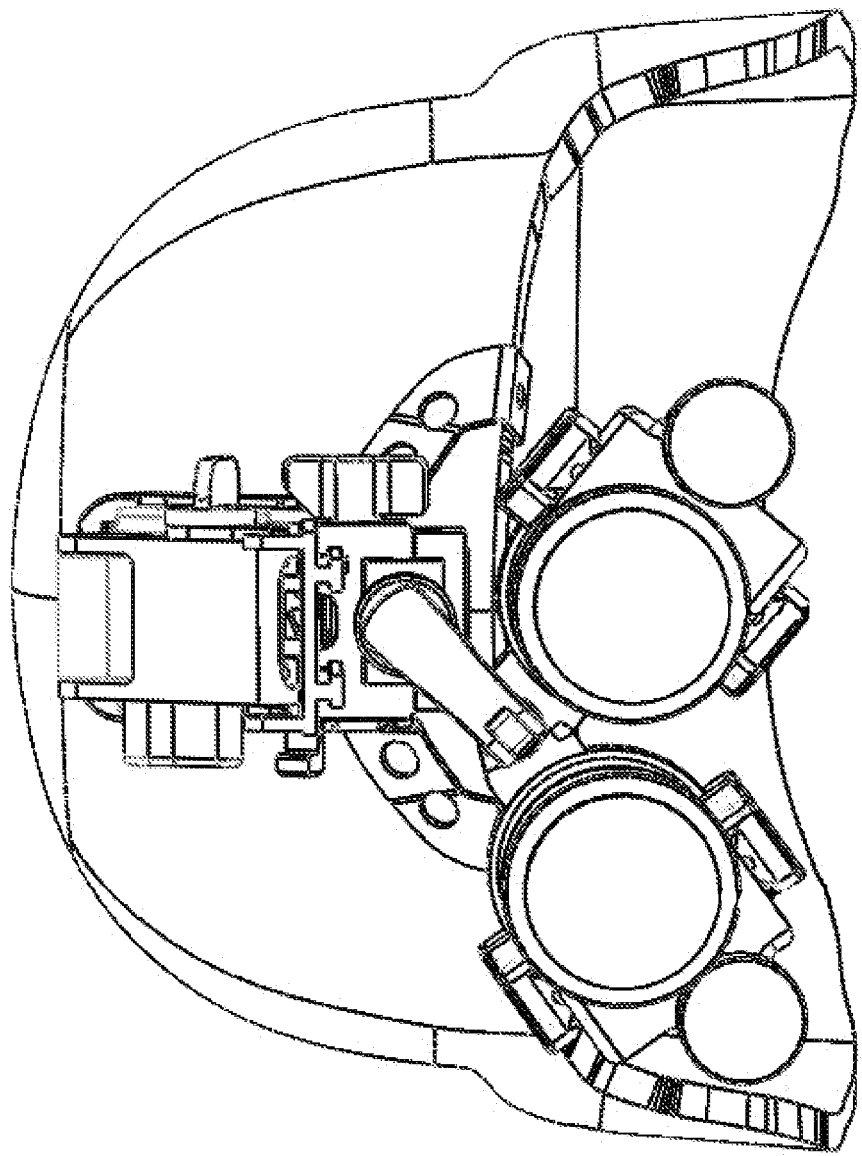
FIG. 10 is a head-on view of the adjustable night vision goggle adapter being used in conjunction with a helmet and depicting the range of motion for the interpuppilary adjustment possible when the night vision goggle is held in front of the right eye.

FIG. 10 depicts the range of motion for the night vision goggle interface 160 while the rotatable arm 130 is positioned to place the night vision goggles 110 over the right eye of a user. This fine adjustment may be referred to as "interpuppilary adjustment" ("I.P.A.") and it can be made to account for differences in the facial structure of a user, differences in the width between the eyes of a user, or differences in the dimensions of the helmets between users. Within the range of motion ("I.P.A. range") the position of the night vision goggles 110 is infinitely adjustable, and the position of the night vision goggles 110 can be fixed by placing the rotatable cam 140 into the closed position.

The present disclosure thus provides an adjustable night vision goggle adapter 100 that allows a user to quickly make both coarse and fine adjustments to the positioning of the night vision goggles 110 when in use. The rotating arm 130 allows for coarse adjustment to be made to the positioning of the night vision goggles 110 by allowing for the rotation of the arm into positions defined by the one or more detents 123. Once secured into a detent-defined orientation, the user can then finely adjust the positioning of the night vision goggles 110 by releasing the rotatable cam 140 and rotating the night vision goggle interface 160 within the joint until a desired position is obtained. Then, the rotatable cam 140 can be moved into the closed position which causes a force to be exerted on the joint which holds the night vision goggle interface 160 in the selected orientation. Moreover, because the helmet mount can be rotated, the adjustable night vision goggle adapter 100 can also be used to provide a helmet-to-goggle attachment that allows for quickly positioning the night vision goggles 110 into a "stowed" position away from the eyes.

Figure 11B:
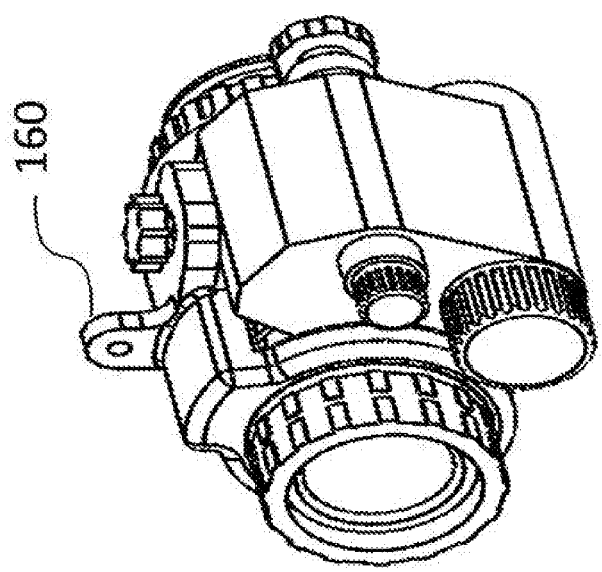
FIG. 11B is a depiction of an alternative night vision goggle design that can be used in conjunction with night vision goggle interface of the adjustable night vision goggle adapter.
Figure 11C:
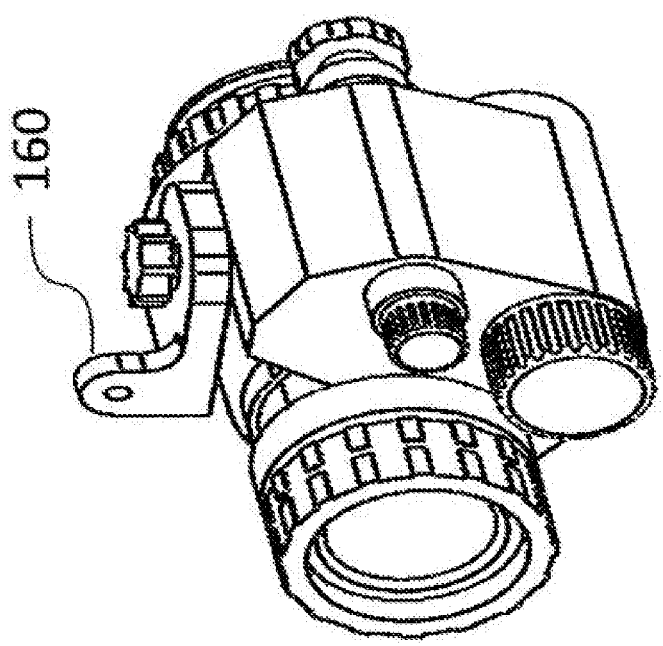
FIG. 11C is a depiction of another alternative night vision goggle design that can be used in conjunction with night vision goggle interface of the adjustable night vision goggle adapter.

As is shown in FIGS. 11A-C, the night vision goggle adapter 100 can be used with a variety of different night vision goggles. Any suitable structure may be used to connect the night vision goggles to the night vision goggle interface 160. For example, the previously depicted U-shaped arm 170 and retainer 150 assembly may be used. A J-arm may alternatively be used where appropriate. As is depicted in FIGS. 11A-C, some goggles will permit a direct mounting of the night vision goggle interface 160 to the goggles, and in such a configuration further componentry to secure the goggles to the night vision goggle interface 160 may include screws with knurled perimeters to facilitate ease of use when hand-tightening the screw.

FIGS. 12A-C depict multiple alternative embodiments of the mounting point 120 that may be used in conjunction with the adjustable night vision goggle adapter 100. Although not limited to only these structures, some embodiments that are depicted here include a goggle "horn" (depicted with the rotating arm 130 in place) (FIG. 12A), a "hotshoe" embodiment (FIG. 12B) designed to provide an electrical connection between the mount on the helmet and the night vision goggles 110 (not depicted), and a dovetail plate (FIG. 12C). In each embodiment, the mounting point 120 is affixed to the body 124. The body 124 is depicted as being coupled to the low-friction bearing 125 and includes a plurality of detents 123 at the detent/ball interface. As will be appreciated by those skilled in the art, the reverse orientation of the detent/ball interface may be used here as an alternative.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. An adjustable night vision goggle adapter device, comprising:
   a mounting point configured to attach to a helmet;
   a body affixed to the mounting point and comprising a surface comprising a first half of a bearing/detent interface having an array of detents and a central axis projecting forward from the body in an anterior direction relative to the helmet and away from the mounting point; and
   an arm rotatable about the central axis, comprising:
      a first end comprising a second half of the bearing/detent interface and being configured to rotate about the central axis; and
      a second end configured to form a joint with a night vision goggle interface, wherein the joint is configured to be rotatable about a shaft and is further configured to be lockable into a fixed position holding the night vision goggle interface at a fixed angle relative to the rotatable arm.

2. The adjustable night vision goggle adapter device of claim 1, wherein the mounting point comprises a goggle horn.

3. The adjustable night vision goggle adapter device of claim 1, wherein each detent of the array of detents is sized to partially receive a spring-loaded ball.

4. The adjustable night vision goggle adapter device of claim 3, wherein the array of detents comprises four detents equally spaced about the central axis of the surface of the body.

5. The adjustable night vision goggle adapter device of claim 1, wherein the joint comprises a rotatable cam having a lever arm configured to rotate the cam between a locked and a released position, the rotatable cam in the locked position being configured to apply a force upon the joint such that the night vision goggle interface is held in the fixed position relative to the rotatable arm.

6. The adjustable night vision goggle adapter device of claim 5, wherein the rotatable cam further comprises a knurled nut configured to be coupled to the joint and rotated about the shaft in a position opposite that of the rotatable cam allowing for an adjustable amount of force to be applied by the rotatable cam on the joint when rotated into the locked position.

7. The adjustable night vision goggle adapter device of claim 5, wherein the joint comprises a setting pin configured to traverse through a longitudinal hole of the shaft and to seat within an ear formed within the second end of the rotatable arm thereby fixing the rotatable cam into an orientation relative to the rotatable arm.

8. The adjustable night vision goggle adapter device of claim 1, wherein the second half of the bearing/detent interface comprises one or more blind wells that contain a spring and a ball such that the spring is compressed and exerts a pressure on the ball.

9. The adjustable night vision goggle adapter device of claim 8, wherein the second half of the bearing/detent interface comprises an equal number of the blind wells, springs, and balls as the array of detents has detents.

10. The adjustable night vision goggle adapter device of claim 1, wherein the mounting point is a hotshoe mount.

11. The adjustable night vision goggle adapter device of claim 1, wherein the mounting point is a dovetail plate.

12. The adjustable night vision goggle adapter device of claim 1, wherein the shaft has an exterior surface that comprises threads.

13. The adjustable night vision goggle adapter device of claim 1, wherein the central axis further comprises a bearing.

14. The adjustable night vision goggle adapter device of claim 13, wherein the bearing is a roller bearing.

15. The adjustable night vision goggle adapter device of claim 1, wherein the adjustable night vision goggle adapter further comprises a U-shaped arm having a goggle retainer at each end.

16. The adjustable night vision goggle adapter device of claim 15, wherein the U-shaped arm has two retainers located at each end configured to secure a night vision goggle at two points on opposing sides of the night vision goggle.

17. The adjustable night vision goggle adapter device of claim 15, wherein the goggle retainers comprise a spring-loaded retention mechanism.

18. An adjustable night vision goggle adapter device, comprising:
   a mounting point configured to attach to a helmet;
   a body affixed to the mounting point and comprising a surface comprising a first half of a bearing/detent interface having:
      one or more blind wells that contain a spring and a ball such that the spring is compressed and exerts a pressure on the ball; and
      a central axis projecting forward from the body in an anterior direction relative to the helmet and away from the mounting point; and
   an arm rotatable about the central axis, comprising:
      a first end comprising a second half of the bearing/detent interface and being configured to rotate about the central axis; and
      a second end configured to form a joint with a night vision goggle interface, wherein the joint is configured to be rotatable about a shaft and is further configured to be lockable into a fixed position holding the night vision goggle interface at a fixed angle relative to the rotatable arm.

19. The adjustable night vision goggle adapter device of claim 18, wherein the second half of the bearing/detent interface comprises an array of detents.

20. The adjustable night vision goggle adapter device of claim 18, wherein the array of detents comprises four detents equally spaced about the central axis.

* * * * *